(No Model)
T. S. CRANE.
CYLINDER DRYING APPARATUS.
No. 585,378. Patented June 29, 1897.
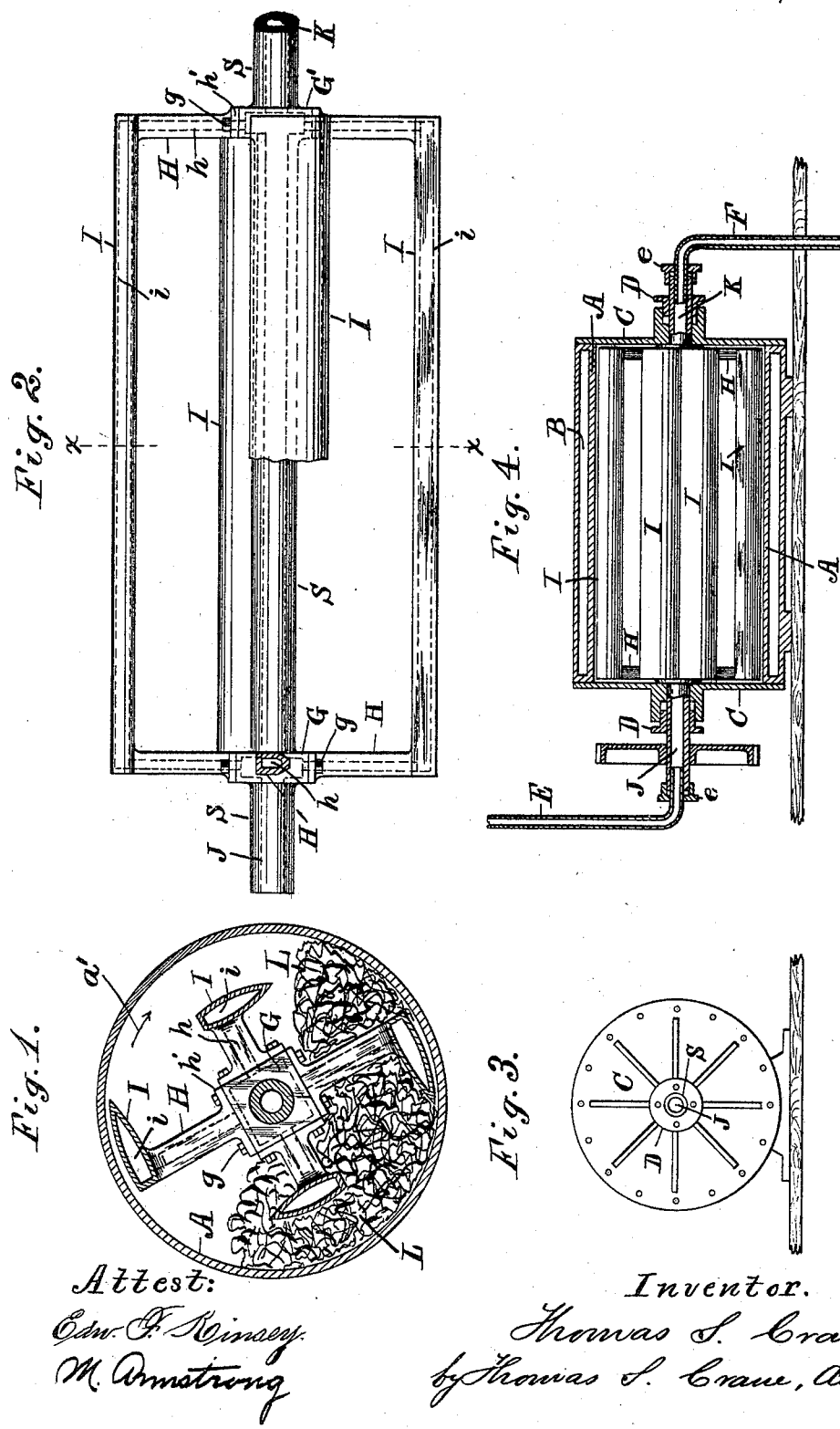
Attest:
Edw. F. Kinsey.
M. Armstrong
Inventor.
Thomas S. Crane
by Thomas S. Crane, Atty.

UNITED STATES PATENT OFFICE.

THOMAS S. CRANE, OF EAST ORANGE, NEW JERSEY, ASSIGNOR TO CYRUS C. CURRIER, OF NEWARK, NEW JERSEY.

CYLINDER DRYING APPARATUS.

SPECIFICATION forming part of Letters Patent No. 585,378, dated June 29, 1897.

Application filed December 21, 1895. Serial No. 572,836. (No model.)

*To all whom it may concern:*

Be it known that I, THOMAS S. CRANE, a citizen of the United States, residing at East Orange, Essex county, New Jersey, have invented certain new and useful Improvements in a Combined Stirring and Heating Device for Drying-Cylinders, fully described and represented in the following specification and the accompanying drawings, forming a part of the same.

The object of this invention is to furnish an effective means of securing a large heating-surface in the stirring device of a cylinder drying-machine, with an exceedingly simple and cheap construction. To effect these results, I attach to the rotary shaft of the drying-cylinder by suitable means a series of longitudinal hollow stirring-blades of peculiar cross-section, such blades being elongated in the direction of their movement, with their broad sides tangential to the curve of their movement, and the blades being heated by steam, as usual. By this construction the stirring-blades not only agitate the material, but serve as a series of scoops which are shaped to present an extended surface in the direction of their movement. As the material slides over this extended surface when the scoops are moved through the same it is exposed to such heated surface for a much longer time than when a round pipe is moved through the material, as is common in such garbage-machines. By forming the blades to scoop up the material and providing each of them in the direction of its motion with an extended surface of heated metal I am enabled to use a very small number in the drying-cylinder, and thus greatly reduce the expense of construction as well as the power needed to agitate the material.

The invention will be understood by reference to the annexed drawings, in which—

Figure 1 is a cross-section of the stirring devices on line *x x* in Fig. 2, with the adjacent body of the cylinder. Fig. 2 is a side elevation of the shaft and stirring devices removed from the cylinder with one of the scoops broken away to exhibit the construction of the hollow arm and the parts being viewed in the direction of the arrow *a* in Fig. 1. Fig. 3 is an end elevation of the drying-cylinder, and Fig. 4 is a longitudinal section of the cylinder with an elevation of the drying devices inside the same.

A is the body of the drying-cylinder; B, a steam-jacket formed about the same in the usual manner; C, the heads, provided with stuffing-boxes D, through which the shaft S is projected, to receive an inlet steam-pipe E and outlet-pipe F. These pipes are swiveled to the shaft by stuffing-boxes *e*. The shaft just inside the heads is shown formed with square collars G G' to provide seats for the attachment of the arms H, which are formed upon the scoops I. A passage J extends from the inlet-pipe E to the interior of the collar G, and a passage K extends from the outlet-pipe to the interior of the collar G'. The scoops are made with steam-chamber *i* inside of each, which is connected with the passages J and K by holes *h*, formed through the arms H. The scoops are made of flattened cross-section and mounted tangentially within the cylinder, so as to easily penetrate the material as they are carried around by the shaft and to present in the direction of their rotation broad surfaces over which the material is moved by the advance of the scoops. To effect these objects, the scoops are preferably formed, as shown in the drawings, of flattened wedge shape with a sharp corner upon the front side to readily penetrate the material L, which is shown in Fig. 1. Such form may be readily made of cast-iron, as shown in the drawings, with the hollow arms H cast in one piece therewith and provided with feet *h'* to secure them upon the sides of the square collars by bolts *g*. By applying suitable packing upon the sides of the square collars the joints may be made steam-tight, and as there is no direct connection between the passages J and K the steam entering from the pipe E is obviously forced to circulate through the scoops to reach the outlet-pipe F. Cast-iron is found to be much more durable for use in garbage-machines, where acid is frequently employed to treat the garbage during or before the drying operation, and my construction thus furnishes a means of making the entire structure of such material.

In Fig. 1 two of the scoops are shown supported close to the body of the cylinder A, so as to move the material where it lies in the bottom of the cylinder, and two other scoops are shown provided with shorter arms H to move them intermediate to the cylinder and the shaft to stir the material which lies between such parts. The scoops are preferably rotated in the direction of the arrow $a'$ in Fig. 1, and it will be observed by referring to the two scoops which are immersed in the material that such material is compelled to slide over the broad surfaces of the scoops, and is thus retained sufficiently in contact with the heated metal to dry the material rapidly.

The outer scoops are exposed to the material chiefly upon their inner sides, but the intermediate scoops are exposed to the material upon both their inner and outer sides, and thus exert a powerful influence in drying the same. A portion of the scoops is moved close to the body of the cylinder, not only to move the material where it lies in the bottom of the cylinder, where it would otherwise remain motionless, but to scrape off from the shell of the cylinder any material which may stick thereto in drying and which would otherwise form into a solid body and interfere seriously with the removal of the charge when dried. Such hollow scoops may be made of boiler-iron or sheet metal and suitably connected to the shafts and passages J, but when made of cast-iron in one piece with the arms H they form an exceedingly simple construction, as the entire stirring device, which affords a very large area of heating-surface, consists of four pieces only in addition to the central shaft. In my construction the broad sides of the scoops may obviously be extended without making any increase of resistance except the frictional contact with the increased surface.

I am aware that broad stirrers with sharp forward edges have been formed with perforated surfaces to distribute air and water through a body of malt, but my construction differs in function from such stirrers by using the extended surface for the conduction of heat and in rotating a portion of them close to the walls of the cylinder, where they could not act efficiently if perforated to distribute fluid into the material.

I do not claim the use of steam-heated stirrers, broadly, nor the mere use of the stirrers with broad sides tapering from the forward edge, but have described the construction and arrangement of my stirrers so that their specific character will be apparent.

Having thus set forth the nature of my invention, what I claim herein is—

1. The combination, with the drying-cylinder A having the steam-jacket B about the same, and the central rotary shaft S provided at its opposite ends with the steam-inlet pipe E and the outlet-pipe F, of the series of hollow imperforate cast-iron scoops I carried by the shaft longitudinally of the cylinder and having a flattened wedge shape in cross-section, as set forth, certain of the scoops being supported and moved close to the shell of the cylinder to detach the material therefrom as it dries, and each of the scoops being formed in one piece with two hollow cast-iron arms H secured to the shaft in connection respectively with the inlet and outlet pipes, as and for the purpose set forth.

2. The combination, with the drying-cylinder A having the steam-jacket B about the same, and the central rotary shaft S provided at its opposite ends with the steam-inlet pipe E and the outlet-pipe F, and formed in one piece of cast-iron with the hollow square collars G, G', near its opposite ends with passages J and K extended from the inlet and outlet pipes respectively within such collars, of the four hollow cast-iron scoops formed each in one piece with the hollow arms H and feet H', the feet being bolted upon the square sides of the collars, and the whole arranged and operated to secure a circulation of steam from and to the collars through the arms and scoops, substantially as herein set forth.

In testimony whereof I have hereunto set my hand in the presence of two subscribing witnesses.

THOMAS S. CRANE.

Witnesses:
L. LEE,
EDW. F. KINSEY.